Patented Dec. 26, 1939

2,185,123

BEST AVAILABLE COPY

UNITED STATES PATENT OFFICE 2,185,123

PROCESS OF PRODUCING STABLE ZEIN SOLUTIONS WITH AUXILIARY SOLVENTS

Roy E. Coleman, Meriden, Conn., assignor to The Zein Corporation of America, a corporation of Delaware No Drawing. Application August 9, 1937,
Serial No. 158,210

16 Claims. (Cl. 134—12)

This invention relates to methods for the production of substantially non-aqueous, stable, alcohol solutions of the prolamins; and more particularly, to methods of producing such stable solutions with the aid of auxiliary solvents. The solutions produced in accordance with my invention are stable at 80° F. and do not separate on standing even when cooled to temperatures of 60° to 70° F. and somewhat below.

In the following description of my invention I will refer to the preparation of substantially non-aqueous alcohol solutions of zein derived from corn, but it is of course to be understood that my invention is also applicable to the preparation of solutions of the other prolamins such as, for example, gliadin from wheat, hordein from barley, kafirin from kafir and the prolamins from other cereal grains. The above-mentioned prolamins are at present derived by extraction with an aqueous alcohol solution in which the added water varies generally from about 15 to 40% of the solvent mixture. The material utilized in accordance with my invention is the dried extract which may be completely dry or the commercial product which contains a small percentage of moisture.

In my co-pending application entitled Process of producing stable zein solutions, Serial No. 158,209, filed August 9, 1937, I have disclosed that, contrary to the prior art, stable solutions of zein in aqueous alcohol are not produced with all concentrations of zein in the alcohol. As pointed out in that application, with concentrations of zein in commercial or 95% ethyl alcohol outside of the critical range therein disclosed and claimed, no solutions are obtainable which remain stable at temperatures under 70° F. In concentrations of zein to 95% alcohol of 1 to 1, a hard solid gel is formed and in concentrations of about 1 part by weight of zein to over 3 and about 4 or more parts by weight of 95% alcohol the solutions almost invariably separate on standing at temperatures below 70° F. and particularly at temperatures between 60 and 70° F. The solutions of the last-named concentrations are at times stable at temperatures of 80° F. and above and these solutions remain stable only if the temperatures are maintained above 80° F. I have found that, as stated in my co-pending application above referred to, only in concentrations of 1 part by weight of zein to from about 2 to about 3 parts of 95% alcohol, are stable solutions formed which do not separate at 80° F. and even at temperatures of 70° F. and somewhat lower.

In accordance with my present invention, I have found that stable, substantially non-aqueous solutions of zein in alcohol can also be formed wherein the zein is present in widely varying concentrations both above and below those set forth for stable solutions in my co-pending application above referred to as well as in that range, including concentrations of from about 1 part by weight of zein to over 3 and about 4 or more parts by weight of alcohol solvent. These solutions are stable on standing at temperatures of 80° F. and below and even at temperatures of 60 to 70° F. and somewhat below. These stabilized solutions, when cooled to temperatures as low as 10° F. or as low as 0° F. may separate or become solid; however, on heating again to temperatures of from 45° to 70° F., a re-solution is effected either without, or with slight stirring and the solutions return to their normal stabilized form at these reheating temperatures. The stable solutions produced in accordance with the present invention are substantially non-aqueous in that they may contain 5% or less of water based on anhydrous ethyl alcohol; whereas the prior art, as indicated in my above-mentioned co-pending application, requires that the solutions contain added water or water in proportions over 5% and preferably over 15%. In tests conducted by me, I have also found that the low-boiling alcohols taken as a class, do not effect solution of zein if the quantity of water in the alcohols varies in amounts ranging from 5% to below 15% and therefore the references in the prior art to over 5% of added water must be taken to mean not under 15%.

The desired non-aqueous stable solutions of zein in alcohol in concentrations of 1 part by weight of zein to over 3 and about 4 or more parts by weight of alcohol can be effected with the aid of what are herein termed "auxiliary solvents". As used herein, the expression "auxiliary solvents" means non-aqueous, alcohol compatible solvents of a well-known type such as, for example, the lacquer solvents, lacquer plasticizers and the like, which may or may not in and of themselves be solvents for zein but which serve to stabilize solutions of zein in alcohol and particularly in alcohol containing 5% or less of added water based on anhydrous ethyl alcohol.

In carrying out my invention, the auxiliary solvent may be first mixed with the alcohol and the mixture then mixed with the zein in a suitable vessel to form the stable solution; or, if desired, the auxiliary solvent may be added to the zein along with the alcohol. In either event, stable zein solutions are obtained on mixing the zein and solvents at temperatures of about 80° F. or with slight heating, say up to about 100 to 125° F. or higher. The stable solutions so formed may, if desired, be diluted with any conventional diluent such as, for example, the lacquer diluents and thinners which are compatible with alcohol, the auxiliary solvent utilized in effecting stabilization, and the alcohol-zein solution.

The proportion of auxiliary solvent employed in carrying out my invention may vary from about 2 to about 25% of the alcohol and even up to 45% and higher. In most instances 10 to 15% of the auxiliary solvent in respect of the alcohol has been found sufficient to effect the desired stable solutions of zein in alcohol in the concentrations stated. The quantity of auxiliary solvent required is influenced to a great extent by the concentration of the zein in the alcohol and, in general, as the concentration of zein in alcohol decreases, the amount of auxiliary solvent required increases and vice versa. The choice of auxiliary solvent used for stabilizing solutions is of course influenced by the purpose intended, properties desired and the peculiar solvent properties of the specific auxiliary solvent utilized.

The auxiliary solvents employed in accordance with my invention may be common lacquer solvents or lacquer plasticizers and the like such as, for example, dioxan; the polyhydric alcohols such as ethylene glycol, diethylene glycol, and the like; the glycol ethers such as ethylene glycol monomethyl ether, ethylene glycol monoethyl ether, diethylene glycol monomethyl ether, diethylene glycol monoethyl ether and the like; ethylene dichloride, tetrachlorethylene and dichlorethyl ether; the ethanol amines such as mono- and tri- ethanol amine; the liquid fatty acids such as oleic and linseed; the esters such as dimethyl phthalate, diethyl phthalate, ethylacetate, tricresyl phosphate and the like; and high boiling ketone alcohols such as diacetone alcohol and the like. It is obvious from the foregoing that other well-known common lacquer solvents, lacquer plasticizers and the like may be used in lieu of those hereinabove set forth.

The following examples are illustrative of the methods embodying my invention and it is to be understood that the auxiliary solvents mentioned in the examples are merely illustrative since the other common lacquer solvents and lacquer plasticizers mentioned above and equivalent lacquer solvents and lacquer plasticizers may likewise be used and the proportions thereof may be varied as hereinbefore set forth. In these examples, the term "parts" indicates parts by weight.

*Example 1*

10 parts of zein are mixed with 40 parts of a solvent mixture consisting of 90% of 95% ethyl alcohol and 10% of ethylene glycol monomethyl ether. On stirring and with the application of a slight heat in the order of 70 to 80° F. a clear stable solution of the zein in 95% alcohol is obtained in about 5 minutes.

*Example 2*

10 parts of zein are placed in a suitable vessel and to this, 44 parts of 95% alcohol and 6 parts of dioxan are added. The mixture is stirred and on the application of heat in the order of 75 to 85° F. a clear stable solution of the zein is produced in about 5 to 10 minutes.

*Example 3*

10 parts of zein are mixed with 40 parts of a solvent mixture containing 84% of 95% alcohol and 16% of diethylene glycol. The mixture is stirred and on the application of heat in the order of 95 to 100° F. for about 5 minutes a clear stable solution of the zein is formed.

*Example 4*

10 parts of zein are mixed with 40 parts of a solvent mixture containing 89% of 95% alcohol and 11% of dichlorethyl ether. The mixture is stirred for about 5 to 10 minutes and on the application of heat in the order of 75 to 85° F. a stable solution of the zein is formed.

*Example 5*

10 parts of zein are placed in a vessel and to this 40 parts of 95% alcohol and 10 parts of linseed fatty acids are added. The mixture is stirred and upon the application of heat in the order of 90 to 100° F. a stable, slightly cloudy solution of zein is produced in about 15 minutes.

With the aid of the auxiliary solvents embodying my invention, it is possible to effect dilution of the stable alcohol solutions, described and claimed in my co-pending application Serial No. 158,209, filed August 9, 1937, with additional alcohol, to concentrations of 1 part by weight of zein to over 3 and about 4 or more parts by weight of the alcohol and still maintain the stability of the solution. Thus, if a small quantity of an auxiliary solvent such as, for example, dioxan or monomethyl ether of ethylene glycol, in the order of, say, about 10 to 20% of the alcohol in a stable 2 to 1 solution of zein, be added to this stable solution, no separation of the solution will take place at temperatures between 60 and 70° F. even if the concentration of alcohol solvent to zein is made to exceed 4 or more to 1 by the addition of more alcohol.

While in the description of my invention and in the operative examples I have disclosed the formation of substantially non-aqueous stable solutions of zein in alcohol plus an added auxiliary solvent, it is obvious that denatured ethyl alcohols may be used to effect the desired stable solutions to the extent that the denaturant utilized serves as an auxiliary solvent.

In the claims when I use the expression "non-aqueous" solutions, I mean solutions containing 5% or less of added water based on anhydrous ethyl alcohol; and when I use the expression "stable" solutions, I mean solutions of zein in alcohol mixtures in which, when the concentration of zein in alcohol varies from about 1 part by weight of zein to over 3 and about 4 or more parts by weight of the solvent mixture, the solutions are stable at 80° F. and do not separate on standing or even when cooled to a temperature of 60 to 70° F. and somewhat lower, and have a decidedly less tendency to thicken and gel than solutions containing large quantities of water.

I claim:

1. The method of producing substantially non-aqueous stable solutions of zein in alcohol in which the concentration of zein in alcohol is in the order of 1 part by weight of the zein to a minimum of over 3 and about 4 parts by weight of alcohol, which comprises mixing the zein with a solvent mixture containing 95% alcohol and stabilizing amounts of an auxiliary solvent selected from the class consisting of substantially non-aqueous, alcoholic compatible lacquer solvents and lacquer plasticizers, thereby producing a substantially non-aqueous solution of zein which is stable against separation of the zein at temperatures of 70° F.

2. The method of producing substantially non-aqueous stable solutions of zein in alcohol which comprises mixing 1 part by weight of the zein with a minimum of over 3 and about 4 parts by weight of a solvent mixture containing 95% alcohol and an auxiliary solvent selected from the class consisting of substantially non-aqueous, alcohol compatible lacquer solvents and lacquer plasticizers, in which the major portion of the solvent mixture is alcohol, thereby producing a substantially non-aqueous solution of zein which is stable against separation of the zein at temperatures of 70° F.

3. The method of producing substantially non-aqueous stable solutions of zein in alcohol which comprises mixing 1 part by weight of zein with 4 to 10 parts by weight of a solvent mixture containing 95% alcohol and stabilizing amounts of an auxiliary solvent selected from the class consisting of substantially non-aqueous, alcohol compatible lacquer solvents and lacquer plasticizers, thereby producing a substantially non-aqueous solution of zein which is stable against separation of the zein at temperatures of 70° F.

4. The method of producing substantially non-aqueous stable solutions of zein in alcohol in which the concentration of zein in alcohol is in the order of 1 part by weight to zein to a minimum of over 3 and about 4 parts by weight of alcohol, which comprises mixing zein with sub-alcohol, which comprises mixing zein with substantially non-aqueous alcohol and a substantially non-aqueous, alcohol compatible auxiliary solvent, the quantity of auxiliary solvent being in the order of 2 to 50% of the alcohol, thereby producing a substantially non-aqueous solution of zein which is stable against separation of the zein at temperatures of 70° F.

5. The method of producing substantially non-aqueous stable solutions of zein in alcohol in which the concentration of zein in alcohol is in the order of 1 part by weight of zein to a minimum of 4 parts by weight of alcohol, which comprises mixing the zein with 95% alcohol and a substantially non-aqueous, alcohol compatible auxiliary solvent, the quantity of auxiliary solvent being in the order of 10 to 15% of the alcohol, thereby producing a substantially non-aqueous solution of zein which is stable against separation of the zein at temperatures of 70° F.

6. The method of producing substantially non-aqueous stable solutions of zein in 95% alcohol in which the concentration of zein in alcohol is in the order of 1 part by weight of zein to 4 to 10 parts by weight of alcohol which comprises mixing zein with 95% alcohol and a substantially non-aqueous, alcohol compatible auxiliary solvent, the quantity of auxiliary solvent being in the order of 10 to 15% of the alcohol, thereby producing a substantially non-aqueous solution of zein which is stable against separation of the zein at temperatures of 70° F.

7. The method of producing substantially non-aqueous stable solutions of zein in alcohol in which the concentration of zein in alcohol is in the order of 1 part by weight of zein to a minimum of over 3 and about 4 parts by weight of alcohol which comprises mixing zein with substantially non-aqueous alcohol and ethylene glycol monomethyl ether, the quantity of said ether being in the order of 10 to 15% of the alcohol, thereby producing a substantially non-aqueous solution of zein which is stable against separation of the zein at temperatures of 70° F.

8. The method of producing substantially non-aqueous stable solutions of zein in alcohol in which the concentration of zein in alcohol is in the order of 1 part by weight of zein to a minimum of over 3 and about 4 parts by weight of alcohol which comprises mixing 95% alcohol and dioxan with the zein, the quantity of dioxan being in the order of 10 to 15% of the alcohol, thereby producing a substantially non-aqueous solution of zein which is stable against separation of the zein at temperatures of 70° F.

9. The method of producing substantially non-aqueous stable solutions of zein in alcohol in which the concentration of zein in alcohol is in the order of 1 part by weight of zein to a minimum of over 3 and about 4 parts by weight of alcohol which comprises mixing zein with 95% alcohol and diethylene glycol, the quantity of said glycol being in the order of 10 to 15% of the alcohol, thereby producing a substantially non-aqueous solution of zein which is stable against separation of the zein at temperatures of 70° F.

10. The method of producing a stable solution of zein in alcohol in which the zein is present in concentrations of 1 part by weight to a minimum of over 3 and about 4 parts by weight of alcohol which comprises incorporating a substantially non-aqueous, alcohol compatible auxiliary solvent in a solution of zein in substantially non-aqueous alcohol wherein the zein is present in concentrations of 1 part by weight to 2 to 3 parts by weight of alcohol and adding substantially non-aqueous alcohol to bring the zein in alcohol to the desired concentration, thereby producing a substantially non-aqueous solution of zein which is stable against separation of the zein at temperatures of 70° F.

11. The method of producing a stable solution of zein in 95% alcohol in which the zein is present in concentrations of 1 part by weight to a minimum of over 3 and about 4 parts by weight of alcohol which comprises incorporating a substantially non-aqueous, alcohol compatible auxiliary solvent in a solution of zein in 95% alcohol wherein the zein is present in concentrations of 1 part by weight to 2 to 3 parts by weight of alcohol and adding 95% alcohol to bring the zein in alcohol to the desired concentration, thereby producing a substantially non-aqueous solution of zein which is stable against separation of the zein at temperatures of 70° F.

12. The method of producing a stable solution of zein in 95% alcohol in which the zein is present in concentrations of 1 part by weight to a minimum of over 3 and about 4 parts by weight of alcohol which comprises incorporating ethylene glycol monomethyl ether in a solution of zein in 95% alcohol wherein the zein is present in concentrations of 1 part by weight to 2 to 3 parts by weight of alcohol and adding 95% alcohol to bring the zein in alcohol to the desired concentration, thereby producing a substantially non-aqueous solution of zein which is stable against separation of the zein at temperatures of 70° F.

13. The method of producing a stable solution of zein in 95% alcohol in which the zein is present in concentrations of 1 part by weight to a minimum of over 3 and about 4 parts by weight of alcohol which comprises adding 10 to 15% of ethylene glycol monomethyl ether to a solution of zein in 95% alcohol wherein the zein is present in concentrations of 1 part by weight to 2 to 3 parts by weight of alcohol and then adding 95% alcohol to bring the zein in alcohol to the desired concentration, thereby producing a substantially non-aqueous solution of zein which is stable against separation of the zein at temperatures of 70° F.

14. The method of producing a substantially non-aqueous stable solution of a prolamin in alcohol wherein the concentration of the prolamin in the alcohol is in the order of about 1 part by weight of the prolamin to a minimum of over 3 and about 4 parts by weight of the alcohol and which in the concentrations named is normally unstable, comprising mixing a prolamin with at least over 3 and about 4 parts by weight of a substantially non-aqueous alcohol and stabilizing amounts of a substantially non-aqueous, alcohol compatible auxiliary solvent, thereby producing a substantially non-aqueous solution of the prolamin in alcohol which is stable against separation of the prolamin at temperatures of 70° F.

15. The method of producing a substantially non-aqueous stable solution of zein in alcohol wherein the concentration of zein in the alcohol is in the order of about 1 part by weight of zein to a minimum of over 3 and about 4 parts by weight of the alcohol and which in the concentrations named is normally unstable, comprising mixing zein with at least over 3 and about 4 parts by weight of a substantially non-aqueous alcohol and stabilizing amounts of a substantially non-aqueous, alcohol compatible auxiliary solvent, thereby producing a substantially non-aqueous solution of zein in alcohol which is stable against separation of the zein at temperatures of 70° F.

16. The method of producing a substantially non-aqueous stable solution of zein in 95% alcohol wherein the concentration of zein in the alcohol is in the order of about 1 part by weight of zein to a minimum of over 3 and about 4 parts by weight of the alcohol and which in the concentrations named is normally unstable, comprising mixing zein with at least over 3 and about 4 parts by weight of 95% alcohol and stabilizing amounts of an auxiliary solvent selected from the class consisting of substantially non-aqueous, alcohol compatible lacquer solvents and lacquer plasticizers, thereby producing a substantially non-aqueous solution of zein in 95% alcohol which is stable against separation of the zein at temperatures of 70° F.

ROY E. COLEMAN.